United States Patent
Gendron et al.

(10) Patent No.: US 8,249,843 B1
(45) Date of Patent: Aug. 21, 2012

(54) PREDICTING AERODYNAMIC IMPACTS FOR SMALL APPENDAGES (IRCM INSTALLATION) ON LARGE FIXED WING AIRCRAFT USING COMPUTATIONAL FLUID DYNAMICS

(75) Inventors: Peter Q. Gendron, Merrimack, NH (US); Michael R. Mendenhall, Los Gatos, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 801 days.

(21) Appl. No.: 12/350,601

(22) Filed: Jan. 8, 2009

Related U.S. Application Data

(60) Provisional application No. 61/010,403, filed on Jan. 8, 2008.

(51) Int. Cl.
  *G06F 7/60* (2006.01)
  *G06G 7/50* (2006.01)
  *B64C 13/00* (2006.01)
  *B64C 13/36* (2006.01)
  *B64C 3/38* (2006.01)

(52) U.S. Cl. .............. 703/9; 703/2; 244/75.1; 244/78.1; 244/99.11; 244/99.12

(58) Field of Classification Search .................. 703/2, 9; 244/75.1, 78.1, 99.11, 99.12
See application file for complete search history.

(56) References Cited

U.S. PATENT DOCUMENTS

| | | | |
|---|---|---|---|
| 4,532,801 A | * | 8/1985 | Coder et al. ................. 73/866.4 |
| 5,046,358 A | | 9/1991 | Wulf et al. |
| 5,309,379 A | | 5/1994 | Rawlings et al. |
| 5,374,011 A | | 12/1994 | Lazarus et al. |
| 5,801,969 A | * | 9/1998 | Nagahama ........................ 703/9 |
| 6,340,134 B1 | * | 1/2002 | Meschino ................... 244/45 R |
| 6,341,532 B1 | | 1/2002 | Xu et al. |
| 6,424,923 B1 | | 7/2002 | Huyer et al. |
| 6,481,667 B1 | | 11/2002 | Ho |
| 6,826,492 B2 | | 11/2004 | Newman |
| 7,054,768 B2 | | 5/2006 | Anderson |
| 7,239,990 B2 | * | 7/2007 | Struijs ............................... 703/2 |
| 7,302,840 B2 | * | 12/2007 | Hanff et al. ..................... 73/148 |

\* cited by examiner

*Primary Examiner* — Kandasamy Thangavelu
*Assistant Examiner* — Nithya Janakiraman
(74) *Attorney, Agent, or Firm* — Daniel J. Long; Robert K. Tendler

(57) ABSTRACT

A method for predicting aerodynamic impact for small appendages on aircraft, wherein the improvement comprises using an adaptable computational fluid dynamic model of airflow adjacent the appendage by isolating a patch surrounding the small appendage, measuring the load on the patch without the appendage in place and with the appendage in a place and subtracting the two for increasing computational accuracy of the load predictions for the small appendage to be able to measure the effect of the small appendage.

1 Claim, No Drawings

PREDICTING AERODYNAMIC IMPACTS FOR SMALL APPENDAGES (IRCM INSTALLATION) ON LARGE FIXED WING AIRCRAFT USING COMPUTATIONAL FLUID DYNAMICS

CROSS-REFERENCE TO RELATED APPLICATION

This application claims rights under 35 U.S.C. §119(e) from U.S. Application Ser. No. 61/010,403 filed Jan. 8, 2008, the contents of which are incorporated herein by reference for all purposes.

STATEMENT OF GOVERNMENT INTEREST

This invention was made with United States Government assistance under Contract No. HSSCHQ-04-C-00342 awarded by the Department of Homeland Security. The United States Government has certain rights in this invention.

BACKGROUND OF THE INVENTION

1. Field of the Invention

The present invention relates to fluid dynamics and more particularly to predicting aerodynamic impacts for appendages on aircraft.

2. Brief Description of Prior Developments

When using Infrared Countermeasures (IRCM) on aircraft, the aerodynamic impact of the appendages are predicted.

A need exists, therefore, for a way to predict impacts (less than of 1% of total loads) of relatively small appendages on large aircraft including predicting airflow velocities and pressures on and in the vicinity of Infrared Countermeasures Optical Devices and their housings protruding from the airframe of large fixed wing aircraft. A need also exists for a way to evaluate the effectiveness of aerodynamic devices and features on controlling or reducing the effects of aerodynamic loads on those IRCM devices and housings.

SUMMARY OF INVENTION

The present invention is an adaptable computational fluid dynamic model of the airflow and the airframe in the vicinity of the IRCM devices using "patch" approach to the CFD modeling. A way to evaluate an aircraft model with and without IRCM devices to isolate impacts on each "patch" also is encompassed within this invention.

DETAILED DESCRIPTION OF THE PREFERRED EMBODIMENT

For large aircraft, it is complicated to predict the impact of relatively small appendages especially for devices with less than 1% impact on total aircraft loads. For flight testing or wind tunnel testing, this impact is within the accuracy of the test measurement equipment making it impossible to accurately measure. Therefore, an analysis method was derived that allows for assessment of the impacts as well as a detailed understanding of the flow characteristics around the appendage.

The analysis effort concentrated on the use of advanced viscous Computational Fluid Dynamics (CFD) methods for the aerodynamic analyses. Given the nature of the analysis problem, that is, the aerodynamic characteristics of the system exhibited very low drag compared to the aircraft to which it was attached, it was apparent from the beginning that the appropriate computational method would involve the solution of the three-dimensional, compressible, Navier-Stokes equations with all viscous and turbulence effects included. Drag prediction with these methods is the state of the art of computational aerodynamics at the present time. The turbulent solutions were obtained with the Spalart-Allmaras one-equation turbulence model. The appendage geometry (IRCM device) was added to the full fuselage model of a 767 200 aircraft. The solutions obtained at flight conditions defined by altitude, Mach number, and flow angles will correctly represent the flow conditions on the aircraft. The boundary layer will have the correct thickness based on the flow along the length of the fuselage, and the interference effects of the fuselage flow on the components of the appendage will be correct. Because of their anticipated small influence on the flow field in the vicinity of the system on the center of the fuselage, other aircraft features such as the wing, nacelles, and tail were not included in the computational grid. These aircraft features have minimal influence on the flow characteristics on the fuselage in the region of interest for this analysis.

As noted previously, the size of the appendage is small compared to the size of a typical commercial aircraft, and by requirement the drag of the system is less than 1% of the drag of the aircraft at cruise. It is the small magnitude of the drag of the system components that creates special analysis problems in achieving accurate computational results. The purpose of this section is to describe the approach used to accomplish the most accurate drag analysis possible with CFD.

Each component of the system has aerodynamic forces caused by the local flow field, the interference from the aircraft fuselage, and the interference between the individual components of the system. The aerodynamic forces are the result of a pressure distribution on the surface of the component; however, there is an additional contribution to the lift and drag of the overall system, and that contribution is called the installed, or carryover, lift and drag. The installed aerodynamic forces are those transmitted to the aircraft fuselage from the components of the system. For example, the pressure distribution on the individual system components bleeds over onto the fuselage or has an interference effect on the fuselage. That is, the pressure on the fuselage in the vicinity of the system components is different from the pressure distribution on the fuselage without the components in place.

The current state of the art of CFD drag analysis is such that the drag of a typical commercial aircraft can be predicted to an accuracy of approximately 0.5%. This level of accuracy is difficult to achieve for a complete aircraft, but with care it is possible. Putting it another way, the numerical difference between two runs on the same fuselage with different computational parameters selected is the same order of magnitude as the drag of interest. For the drag analysis of the system components, the major problem is that the total drag of the components is the same order of magnitude as the error in the predicted drag of the aircraft. For this reason, a special "patch" approach was used to increase the computational accuracy of the installed drag and lift on the fuselage.

The fuselage grids were made as similar as possible with only necessary differences in the region of the appendage caused by the presence of those components. The patch selected for this procedure is a small segment on the fuselage in the region of the system components which includes a portion of the fuselage ahead of the appendage and extends downstream to include a portion of the boattail region of the fuselage. It is important to include the downstream features since the system may have some influence on the drag on that portion of the airframe. The aerodynamic forces are obtained by integration of the pressures on the patch with and without the system components and integration of the pressures on the individual components of the system. All CFD runs on the fuselage alone and with the system components in place were converged to the same level as much as possible.

The installed drag on the system is defined as the drag left over when the drag on the patch of fuselage without the system components and the drag of each individual component is subtracted from the total drag on the same patch of fuselage with the system components in place. The difficulty in this approach is that the installed drag is the result of a small difference between two large numbers, and the choice of the patch is an effort to reduce the size of the large numbers to increase their accuracy.

Numerical solution convergence is an important factor in the quality and accuracy of the CFD results obtained. The solution process starts with the assumption of a uniform flow field in every grid cell in the flow field, and through an iterative process in which each cell communicates with every other cell in the flow field, the flow finally converges to a solution which is accepted as the correct solution for that flow around that configuration. This process can take several thousand iterations, the number depending on the size and type of grid and the flow characteristics. For example, flows with large separated regions can take much longer to converge (more iterations) than a simple attached flow around a smooth body. In reality, the solution may never converge to an absolute answer, but it may converge to an answer that is close enough for practical analysis purposes; that is, if the difference in the drag from one iteration to the next is much smaller than the drag of the component of interest, the solution is converged for practical purposes. The convergence history of the three components of force on the appendage are monitored to assure the values level out to the level specified.

The aerodynamic results are also dependent on the density of the grid as well as the general quality of the grid. The authors employed a system of best practices for grid generation to achieve the highest quality solutions possible. For this type of accurate measurement of loads due to small appendage on a large aircraft, the grids used were much more refilled with a larger quantity of cells than normally used for prediction of overall forces and moments. The larger grids were used because they provided better definition and resolution of the critical separated flow regions which are important for drag analysis. Since the installed drag of the system is an important feature, accurate flow characteristics on the fuselage alone and with the system installed were needed. As noted above, these grids sizes were not optimized but were refined to reduce the uncertainty in the results and accept the longer run time as a penalty.

While the present invention has been described in connection with the preferred embodiment, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for predicting aerodynamic impact on the performance of an aircraft for a small appendage on an aircraft by providing an aerodynamic load predictor for the load associated with the small appendage with a computational accuracy better than 0.5% with the small appendage being defined as an appendage whose impact on the aerodynamic load on the aircraft is less than 1%, comprising the steps of
    using an adaptable computational fluid dynamic model of airflow to model and evaluate a region adjacent the small appendage by:
    isolating a patch surrounding the small appendage;
    running a computational fluid dynamic model analysis on the patch without the small appendage in place to provide analysis results;
    running a computational fluid dynamic model analysis on the patch with the small appendage in place to provide analysis results; and,
    subtracting the analysis results of the patch without the appendage from the analysis results of the patch with the appendage in place to increase computational accuracy of the load predictions for the small appendage to better than 0.5%.

* * * * *